(12) United States Patent
Fascenda

(10) Patent No.: US 8,515,078 B2
(45) Date of Patent: Aug. 20, 2013

(54) MASS SUBSCRIBER MANAGEMENT

(75) Inventor: Anthony C. Fascenda, North Bethesda, MD (US)

(73) Assignee: Koolspan, Inc., Bethesda, MD (US)

( * ) Notice: Subject to any disclaimer, the term of this patent is extended or adjusted under 35 U.S.C. 154(b) by 0 days.

(21) Appl. No.: 12/882,724

(22) Filed: Sep. 15, 2010

(65) Prior Publication Data

US 2011/0004759 A1    Jan. 6, 2011

Related U.S. Application Data

(60) Division of application No. 11/955,855, filed on Dec. 13, 2007, now abandoned, which is a continuation of application No. 10/964,755, filed on Oct. 15, 2004, now Pat. No. 7,325,133, and a continuation-in-part of application No. 10/679,371, filed on Oct. 7, 2003, now Pat. No. 7,325,134.

(60) Provisional application No. 60/511,096, filed on Oct. 15, 2003.

(51) Int. Cl.
| | |
|---|---|
| *H04L 29/06* | (2006.01) |
| *G06K 9/00* | (2006.01) |
| *G06K 19/00* | (2006.01) |
| *G06F 12/00* | (2006.01) |
| *G11C 7/00* | (2006.01) |

(52) U.S. Cl.
USPC ........... 380/278; 713/168; 713/169; 713/171; 726/9; 726/20; 380/270; 380/286

(58) Field of Classification Search
None
See application file for complete search history.

(56) References Cited

U.S. PATENT DOCUMENTS

| | | | |
|---|---|---|---|
| 5,638,444 A * | 6/1997 | Chou et al. | 380/284 |
| 6,026,165 A | 2/2000 | Marino et al. | |
| 6,397,328 B1 | 5/2002 | Pitchenik | |
| 6,591,364 B1 | 7/2003 | Patel | |
| 6,625,591 B1 | 9/2003 | Vahalia et al. | |
| 7,024,690 B1 | 4/2006 | Young et al. | |
| 7,028,186 B1 | 4/2006 | Stenman et al. | |
| 2002/0090089 A1 | 7/2002 | Branigan et al. | |
| 2002/0150250 A1 * | 10/2002 | Kitaya et al. | 380/277 |
| 2003/0172265 A1 * | 9/2003 | Vu et al. | 713/164 |
| 2003/0235305 A1 | 12/2003 | Hsu | |
| 2004/0039925 A1 * | 2/2004 | McMillan et al. | 713/189 |
| 2004/0264699 A1 | 12/2004 | Meandzija et al. | |

* cited by examiner

*Primary Examiner* — Shin-Hon Chen
(74) *Attorney, Agent, or Firm* — Hunton & Williams LLP

(57) ABSTRACT

An authentication and mass subscriber management technique is provided by employing a key table derived as a subset of a larger key pool, a network edge device, and authentication tokens attached on both the network edge device and on a subscriber's computing device. The network edge device and subscriber's computing device are provided with secure, tamper-resistant network keys for encrypting all transactions across the wired/wireless segment between supplicant (subscriber) and authenticator (network edge device). In an embodiment of the invention, a secure, secret user key is shared between a number of subscribers based upon commonalities between serial numbers of those subscribers' tokens. In another embodiment of the invention, a unique session key is generated for each subscriber even though multiple subscribers connected to the same network connection point might have identical pre-stored secret keys.

5 Claims, 16 Drawing Sheets

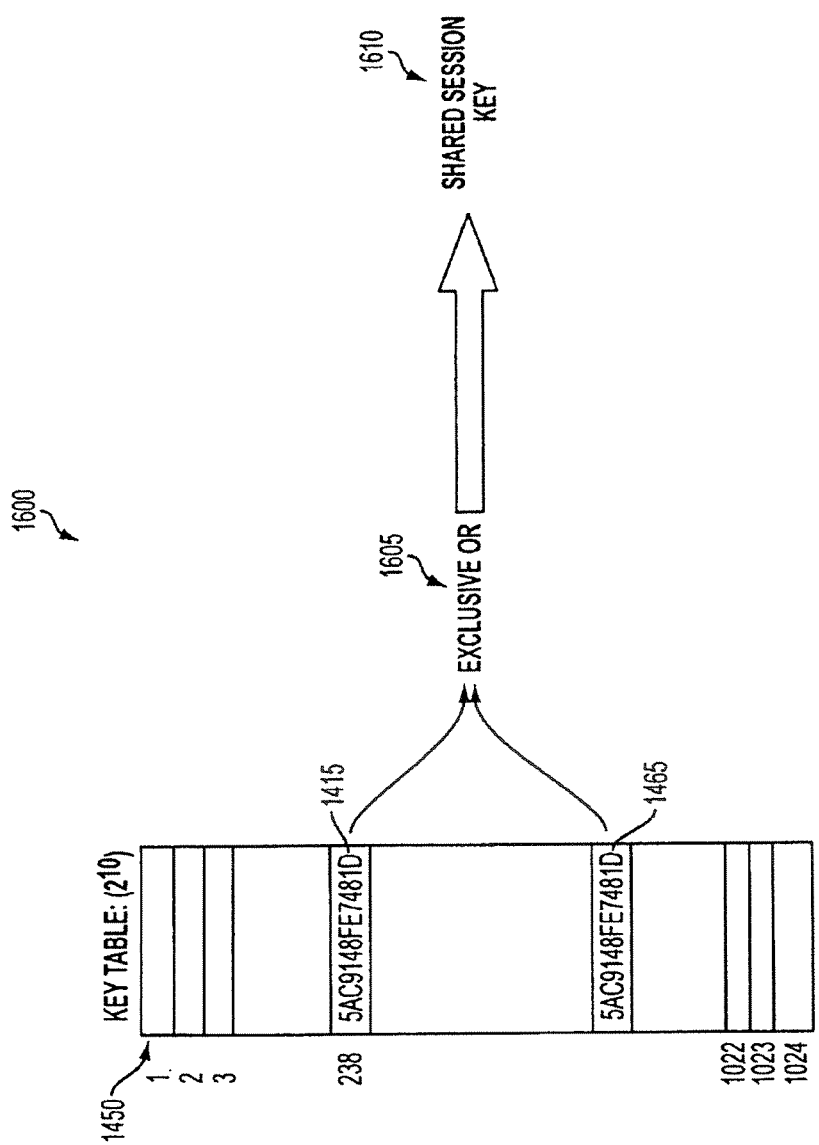

MASS SUBSCRIBER MANAGEMENT

CROSS-REFERENCE TO RELATED APPLICATIONS

The present application is a divisional of U.S. application Ser. No. 11/955,855, filed Dec. 13, 2007, which is a continuation of U.S. application Ser. No. 10/964,755, filed Oct. 15, 2004, which claims priority to United States Provisional Application No. 60/511,096 filed on Oct. 15, 2003, the disclosures of which are incorporated herein by reference in their entireties, and is a continuation-in-part application of U.S. patent application Ser. No. 10/679,371, entitled "Localized Network Authentication and Security Using Tamper-Resistant Keys," filed Oct. 7, 2003, the disclosure of which is incorporated herein by reference in its entirety. The instant application is also related to co-pending U.S. patent application Ser. No. 10/679,268, entitled "Shared Network Access Using Different Access Keys," filed Oct. 7, 2003, and co-pending U.S. patent application Ser. No. 10/679,472, entitled "Self-Managed Network Access Using Localized Access Management," filed Oct. 7, 2003, the disclosures of which are both incorporated by reference in their entireties.

BACKGROUND OF THE INVENTION

1. Field of the Invention

The present invention relates to wireless networking, and more particularly, to a mass subscriber management technique for wireless networks.

2. Description of Related Art

Network subscriber management typically involves a centralized database wherein a list of authorized subscribers (i.e., authorized users) and data pertaining thereto are maintained. When a subscriber attempts to gain access to the services and resources of a private network, the subscriber must first be authenticated by the authentication system in use on the network.

Typically, subscribers are identified by an account name and password. For example, Remote Access Dial-In User Service (RADIUS) is an authentication and accounting system used by many Internet Service Providers (ISPs) that employs account names and passwords. When a subscriber attempts to log into the ISP via RADIUS, their account name (i.e., username) and password must be entered via a login screen. This information is passed to a remote RADIUS server, which checks that the information is correct, and then authorizes access to the ISP network system. If the account name and password are not entered properly, access to the ISP network system is denied.

This type of technology, while standard in the industry, has several problems. First, as it is a centralized method, all database information typically exists in one place at a remote server site and must be backed up for reliability. Second, valuable network bandwidth is occupied during the authentication process. Third, it imposes delays to the subscriber, as the subscriber must wait to be authenticated by the remote server. Fourth, real-time access to the remote authentication server must be provided, requiring the server and network to be both highly available and reliable. These are all critical issues for ISPs that provide wireless connectivity in public areas, also known as "Hot Spots," via the use of an edge device such as access point.

De-centralizing the subscriber database by pushing the subscriber information out from the center to the edge of the wired network, i.e., at the Hot Spot, is problematic because of two concerns. First, a wireless network service provider can implement a number of edge devices. Each edge device must be provided and updated with the same database of subscriber account names and passwords, thereby requiring a heavy burden to synchronize all of the edge devices' subscriber databases. Such synchronization further wastes value network bandwidth that could be dedicated to in-band communications. Second, as the subscriber database reaches a critical point, the available memory and processing resources within the edge device is typically insufficient to store and process the database.

SUMMARY OF THE INVENTION

The present invention overcomes these and other deficiencies of the prior art by providing an edge-based subscriber authentication and management technique that does not require real-time access to a centralized database.

In an embodiment of the invention, a method for authenticating a communications device attempting to access a network comprises the steps of: receiving an identifier associated with a communications device; calculating a number based on a computation of the identifier; selecting a cryptographic key specified by the number from a key table; and performing an authentication technique that employs the cryptographic key to determine whether the communications device is permitted to access a network. The identifier can be a serial number of a token.

In another embodiment of the invention, a network device comprises: a transceiver, a hardware chip coupled to the transceiver, wherein the hardware chip processes an identifier received from a remote communications device via the transceiver; calculates a number based on a computation of the identifier; selects a cryptographic key specified by the number from a key table; and performs an authentication technique that employs the cryptographic key to determine a level of authentication for the remote communications device. The transceiver can be a wireless transceiver and the hardware chip can be coupled to the transceiver via a universal serial bus.

In another embodiment of the invention, a method of identifying a cryptographic key of a remote communications device comprises the steps of: receiving a serial number uniquely associated with a remote communications device; calculating an integer X equal to a remainder after dividing the serial number by a modulus N; and identifying an Xth cryptographic key from a key table. The serial number can be a serial number of a token associated with the remote communications device.

In yet another embodiment of the invention, a method of securing data comprises the steps of: retrieving a unique serial number and a cryptographic key; computing an initialization vector based upon the unique serial number and the selected cryptographic key; and encrypting data using the computed initialization vector and the cryptographic key. The step of computing an initialization vector can comprise discarding a ciphertext output of an encryption of the unique serial number.

In yet another embodiment of the invention, a method of establishing a unique shared session key between two or more parties comprises the steps of: receiving a serial number transmitted from another party, retrieving a first secret key of the another party from a key table common to all parties, retrieving a locally stored second secret key, and deriving a shared session key from the first and second secret keys. The first serial number can comprise a serial number associated with a physical token, which is coupled to a communications device of the another party.

In yet another embodiment of the invention, a network device comprises: a transceiver, a hardware chip coupled to the transceiver, wherein the hardware chip processes a serial number received from a remote communications device via the transceiver, retrieves a first secret key associated with the serial number from a key table, retrieves a locally stored second secret key, and derives a shared session key from the first and second secret keys. The transceiver can be a wireless transceiver. The hardware chip can be coupled to the transceiver via a universal serial bus.

An advantage of the invention is that very large numbers of subscribers can be authenticated using minimal network resources and without requiring a remote authentication server. Another advantage of the invention is that an unlimited number of token-equipped subscribers can be authenticated and successfully managed by local network edge devices. Yet another advantage of the invention is that a unique encryption session key can be generated for each subscriber after authentication takes place.

Another advantage of the invention is that remote subscriber secret keys can be obtained using a key table comprising a set of randomly selected keys where the keys have no mathematical relationship to the serial number of the smart card. Another advantage of the invention is that a remote subscriber secret key can be obtained with no limits of scale and requiring no further communications or additional network server support.

Yet another advantage of the present invention is that it provides a technique to compute a shared session key between two or more parties where the parties have no previous knowledge or each other and do not exchange keys or any secret information. Yet another advantage of the invention is that the computed shared session key is the result of a mathematical process performed independently by each party.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIG. 16 illustrates a technique for deriving a shared session key according to an embodiment of the invention.

DETAILED DESCRIPTION OF THE PREFERRED EMBODIMENTS

Figure 1:
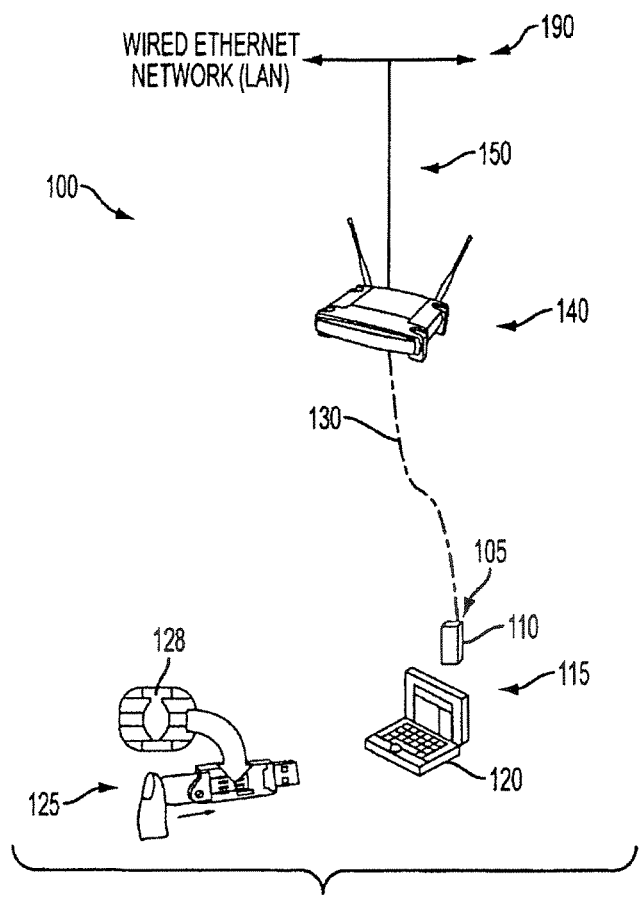
FIG. 1 illustrates an 802.11(x) wireless network service provider system according to an embodiment of the invention.

Preferred embodiments of the present invention and their advantages may be understood by referring to FIGS. 1-16, wherein like reference numerals refer to like elements, and are described in the context of an IEEE 802.11(x) ("Wi-Fi", wherein "x" denotes any of the various extensions of 802.11 such as "a", "b", or "g") wireless network operating in the public space for wireless subscribers. As would be readily apparent to those skilled in the art, the inventive techniques described herein are well suited for any type of wired and/or wireless communications protocol.

FIG. 1 illustrates an 802.11(x) wireless network service provider system (100) according to an embodiment of the invention. A subscriber of the system (100) employs a computing device (120), such as a laptop, having a wireless network interface card (NIC, 110). The NIC (110) enables communications over an 802.11(x) wireless network (130) between the computing device (120) and a network edge device (140), such as a network access point, which is connected to a wired network (190), such as an Ethernet network, via a wired connection (150), such as an Ethernet cable. The wired network (190) is preferably connected to the Internet, thereby permitting a subscriber access to the Internet. A set of software drivers (115) is provided to interface the NIC (110) to the operating system of the subscriber's computing device (120) and network protocols implemented over the network (130). The NIC (110) is addressed by a Media Access Control (MAC) address (105) or other unique identifier. One of ordinary skill in the art recognizes that the wireless network service provider system (100) can implement more than one network edge device (140), thereby enabling multiple hotspots.

Each subscriber is provided with a physical token (125) ("subscriber token") comprising an integrated circuit (128) (or "smart card") or an appropriate cryptographically equipped hardware chip. The subscriber token (125) is preferably configured such that it can be connected to the computing device (120) via a Universal Serial Bus (USB) interface. In alternative embodiments, the subscriber token can take the form of an expansion card, PC card, Personal Computer Memory Card International Association (PCMCIA) cards, serial port hardware, parallel port hardware, or any other hardware configuration that can be coupled to the computing device (120). The subscriber token (125) includes a pre-stored set of cryptographic keys that is never exposed to the subscriber or to any network administrator. These pre-stored keys are used to encrypt data that is transferred from the subscriber's computing device (120) to the network edge device (140) preferably in accordance with one or more techniques described in commonly owned and copending U.S. patent application Ser. Nos. 10/679,268, 10/679,371, and 10/679,472, the disclosures of which are incorporated herein by reference in their entirety. Nonetheless, one of ordinary skill in the art recognizes that other secure communications techniques can be implemented in alternative embodiments of the present invention. The smart card (128) can be selected from those available from a wide-variety of manufacturers and preferably is designed and manufactured according to standard International Standards Organization (ISO) specifications, e.g., ISO Specification 7816.

Figure 2:
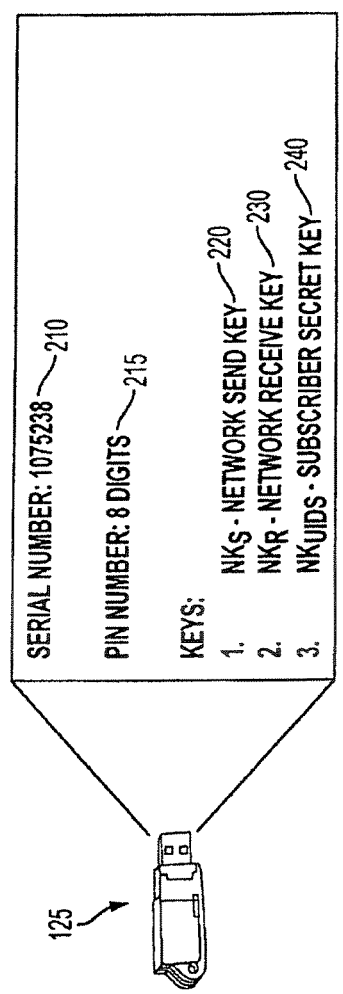
FIG. 2 illustrates subscriber token elements according to an embodiment of the invention.

FIG. 2 illustrates elements of the subscriber token (125) according to an embodiment of the invention. Particularly, each subscriber token (125) is identified by a uniquely assigned serial number (210). For example, the serial number (210) can be an eight-byte field that is laser-etched or otherwise permanently inscribed into each token. While the serial number (210) can be freely read, it cannot be changed. Each token is further provided with a pin number (215) that serves as a password. The subscriber, i.e., owner, of the subscriber token (125), can be required to know the pin number (215) in order to unlock the subscriber smart card (128) during an initiation/installation process. The subscriber can change his/her pin number (215) at any time, but it is assumed that the subscriber, if careful, is the only one who knows his pin number (215). In an embodiment of the invention, a certain number of successive failures, e.g., three, to enter the correct pin number will render the smart card (128) permanently useless.

The pre-stored set of cryptographically include a Network Send Key ($NK_S$, 220), a Network Receive Key ($NK_R$, 230), and a Subscriber Secret Key ($NK_{UIDS}$, 240). The Network Send Key (220) is used to encrypt communications to the network edge device (140). The Network Receive Key (230) is used to decrypt communications received from the network edge device (140). The Network Send Key (220) and the Network Receive Key (230) are common to all subscribers of the wireless network service provider system (100). The Subscriber Secret Key (240), however, is generally assigned uniquely to each subscriber. A more detailed explanation of the generation of the above-identified keys is provided in commonly owned U.S. patent application Ser. Nos. 10/679, 268, 10/679,371, and 10/679,472.

In the present invention, the same Subscriber Secret Key (240) is provided to more than one subscriber. This feature is particularly advantageous in a wireless network service provider system having a large number of subscribers or possible subscribers. For example, in a system implementing a 256-bit Subscriber Secret Key (240), there are $2^{256}$ (~1.158×10$^{77}$) possible unique keys in the overall key pool. The storage and/or processing of such a large pool, or even a portion thereof, typically exceeds the storage and/or processing capabilities of the edge device (140), particularly in legacy access points. Accordingly, there is a need to limit the number of cryptographic keys to be stored and processed at the edge device (140) while still maintaining a relatively large bit-length (i.e., secure) Subscriber Secret Key (240).

Figure 3:
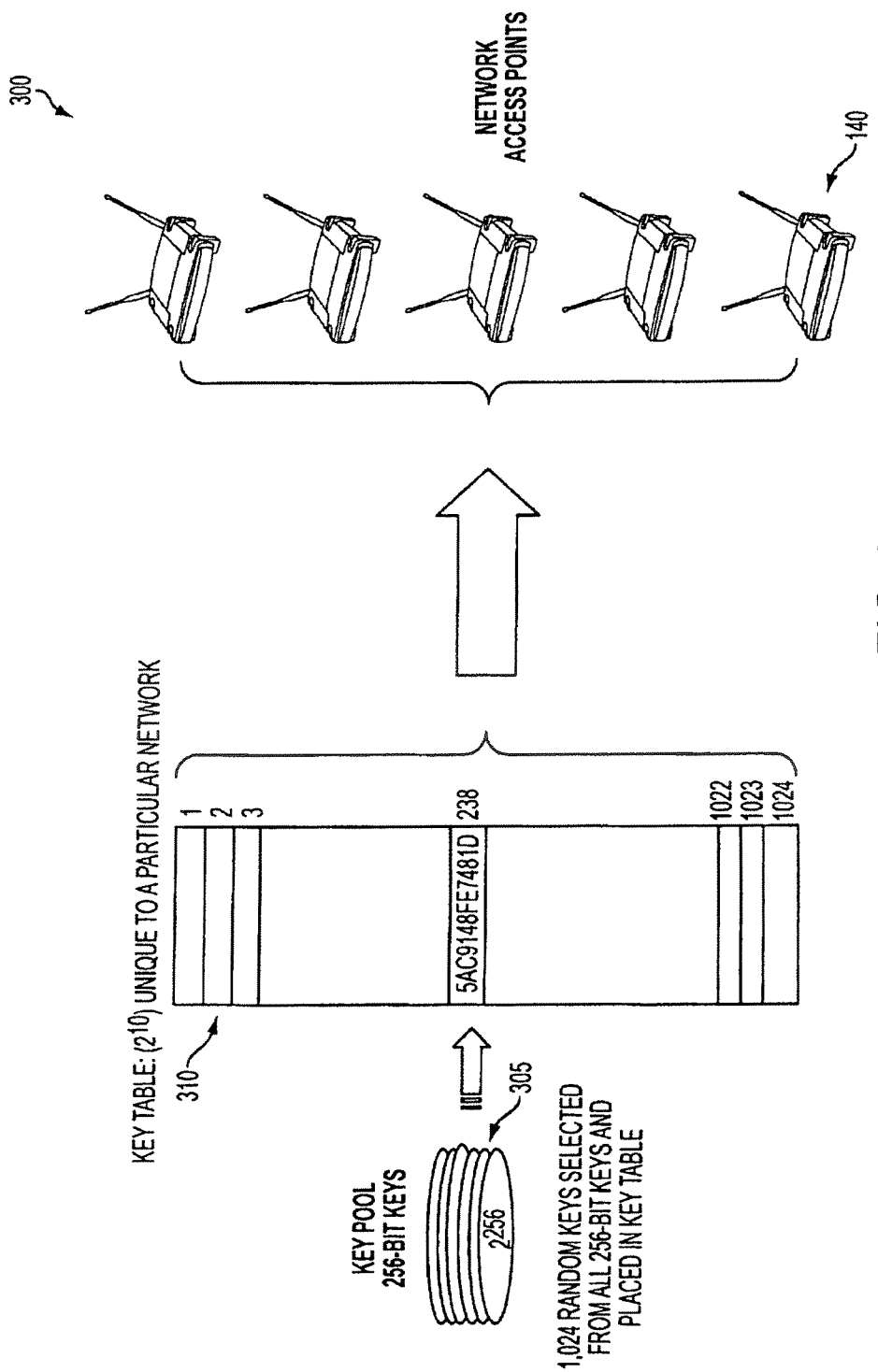
FIG. 3 illustrates a key table system for multiple network edge devices according to an embodiment of the invention.

FIG. 3 illustrates a key table system (300) for multiple network edge devices according to an embodiment of the invention. The key table system (300) comprises a key pool (305) having a 256-bit key space, i.e., $2^{256}$ unique 256-bit Subscriber Secret Keys (240). One of ordinary skill in the art recognizes that the use of a 256-bit length cryptographic key is exemplary only and that other various bit lengths can be implemented depending on, for example, the level of security desired in the wireless network service provider system (100). A subset of the keys in the key pool (305) is selected for use in the wireless network service provider system (100) based on, for example, the available memory and processing capability at the edge device (140). The subset can be selected manually by an administrator or automatically by software. In an exemplary embodiment of the invention, a 10-bit subset of the key pool (305) is selected, i.e., 1,024 ($2^{10}$) keys from the total key pool ($2^{256}$), and then implemented as a key table (310). Each edge device (140) is provided with the key table (310) comprising 1,024 keys. In a preferred embodiment of the invention, the key table (310) is communicated to an edge device (140) in encrypted form. Note that 1,024 ($2^{10}$) keys out of $2^{256}$ possible keys means that statistically speaking, one has a 1:$2^{246}$ chance of stumbling onto one of the keys in the key table (310), a statistically improbable possibility.

Figure 4:
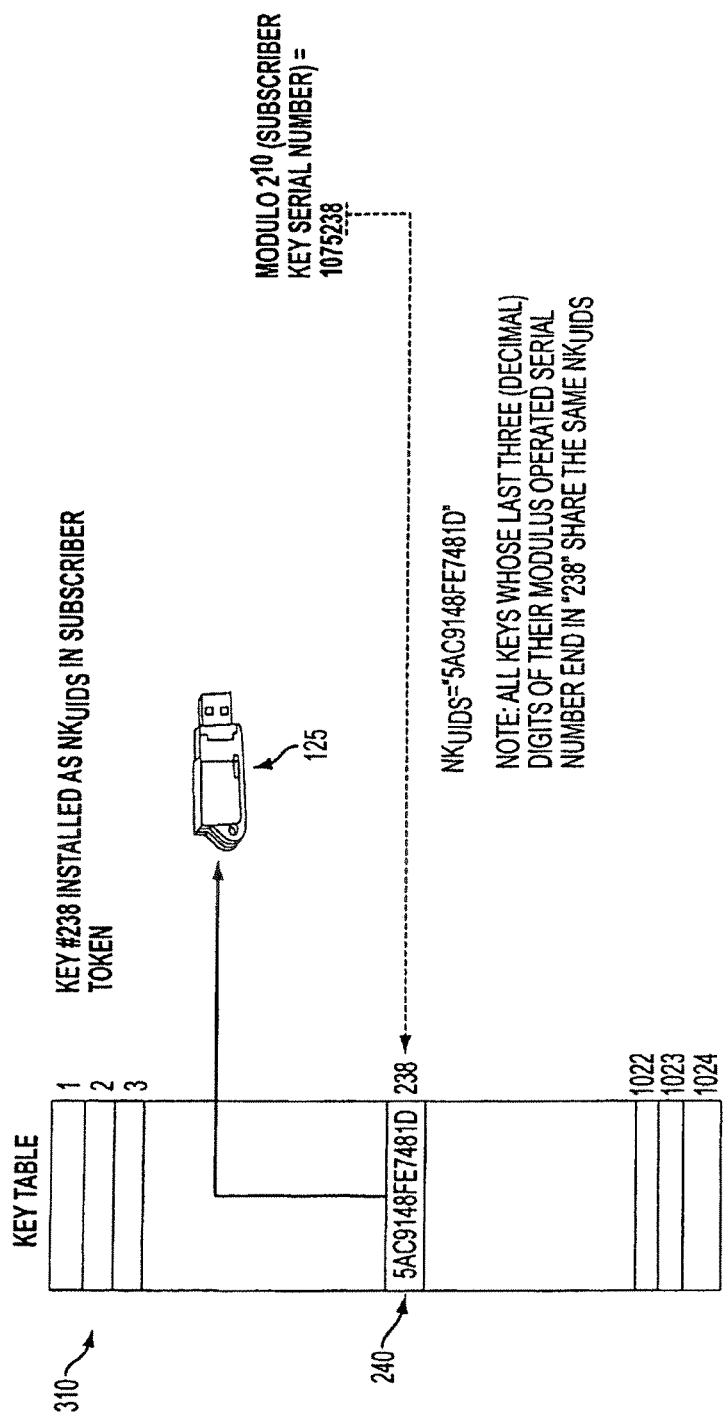
FIG. 4 illustrates subscriber secret key assignment according to an exemplary embodiment of the invention.

According to an embodiment of the invention, the subscriber is associated with a specific Subscriber Secret Key (240) from the key table (310) as determined by a mathematical operation performed on the subscriber's integrated circuit serial number (210). In an exemplary embodiment, the mathematical operation is a 10-bit modulus operation and is performed on the serial number (210) to identify a particular Subscriber Secret Key (240) from the key table (310). Referring to FIG. 4, which illustrates operation of a particular subscriber secret key assignment, if the modulus operation on the serial number (210) results in a value ending in "238" (215), the subscriber's integrated circuit (128) is provisioned with the 238$^{th}$ Subscriber Secret Key (240) in the key table (310). There would be no specific entry of this relationship in the key table (310) stored within the edge device (140) and no further entry anywhere in the administration of the subscriber key table system (300) regarding assignment of "Subscriber Secret Keys" to specific subscribers. Every subscriber in the network is assumed to have a Subscriber Secret Key (240) calculated based on the preferred modulus operation performed on his or her serial number (210) deriving, therefore, a specific Subscriber Secret Key (240) out of the key table (310). In other words, the edge device (140) gains knowledge of the Subscriber Secret Key (240) only knowledge of the preferred modulus operation and the subscriber's serial number (210). While it is entirely possible that more than one particular subscriber will be provisioned with the same Subscriber Secret Key (240) while associated with the same edge device (140), it will be shown that it is not possible for one subscriber to have access to the other's data and vice-versa.

Figure 5:
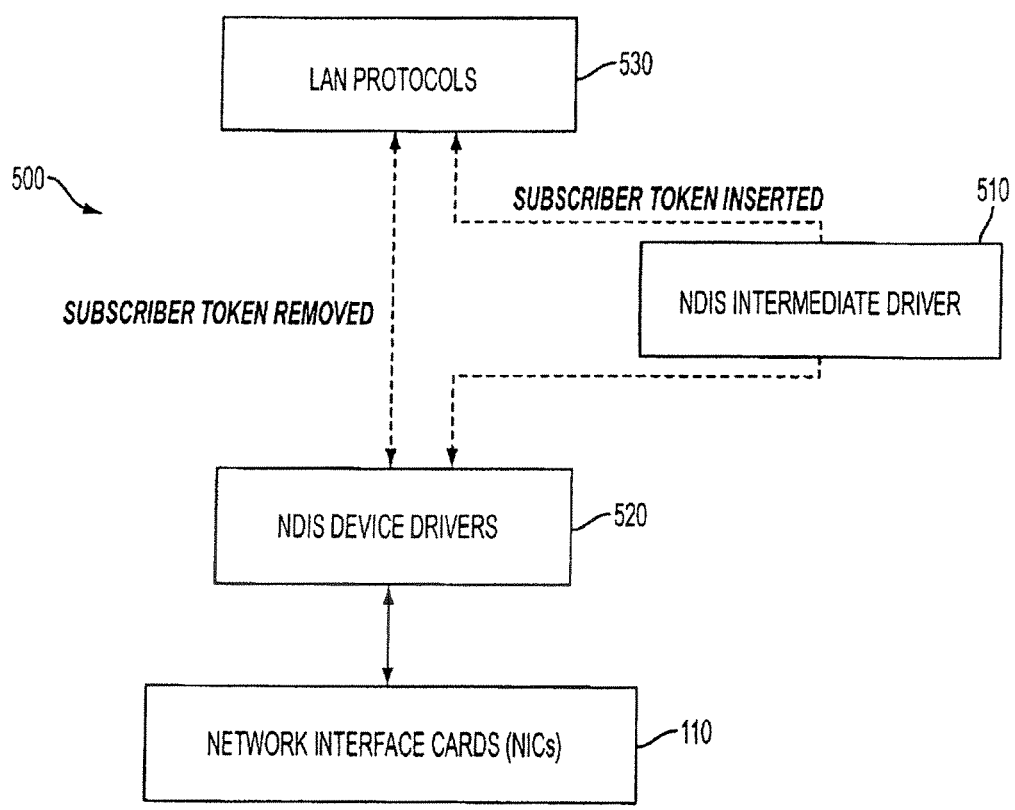
FIG. 5 illustrates a network driver interface system according to an embodiment of the invention.

Referring to FIG. 5, which illustrates a network driver interface system (500), a subscriber implements a set of software drivers (115) comprising a Network Driver Interface Specification (NDIS) intermediate driver (510). The NDIS intermediate driver (510) is a software program that is implemented between the normal operating system, e.g., Windows, low-level device driver (520) and the LAN Protocols layer (530). When the subscriber token (125) is coupled to the subscriber's computing device (120), the NDIS Intermediate driver (510) intercepts all network bound and network originated packets. Once the subscriber NIC (110) successfully performs an "Open Authentication Standard" followed by an "association" (the implementation of which are apparent to one of ordinary skill in the art), the NDIS Intermediate Driver (510) commences a secondary authentication with the edge device (140) using a protocol as described below.

Figure 6:
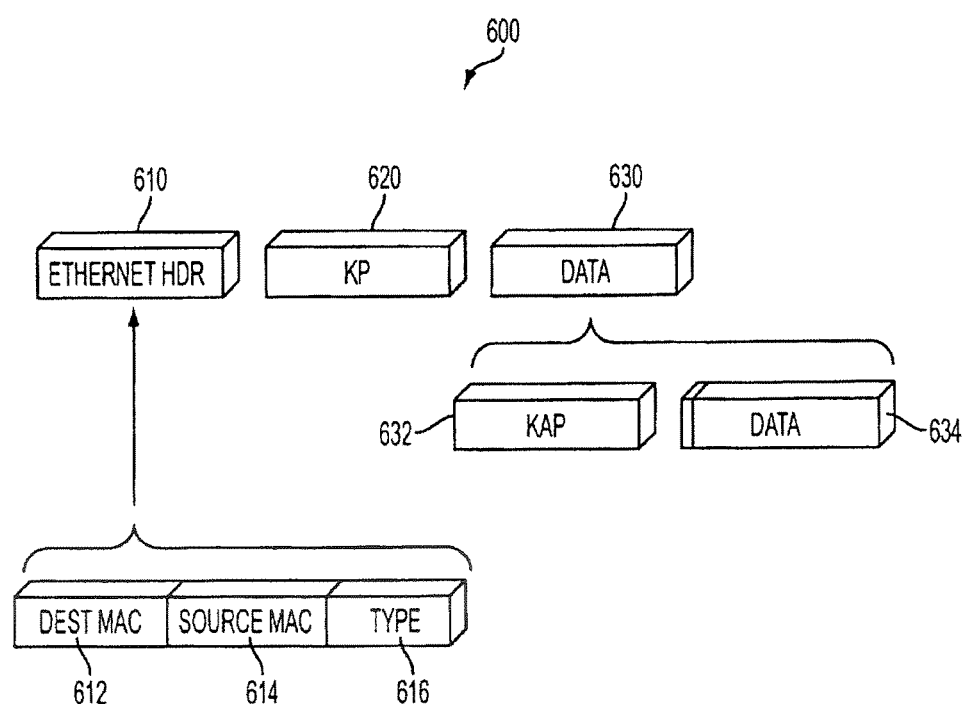
FIG. 6 illustrates a data transmission protocol format for a first authentication data transmission according to an embodiment of the invention.

FIG. 6 illustrates a data transmission protocol format for a first authentication data transmission (600) according to an embodiment of the invention. The first authentication data transmission (600) is formed by the NDIS intermediate driver (510) and comprises an Ethernet header (610), followed by a protocol header (620), and a data packet (630). The Ethernet header (610) comprises a destination MAC address (612), a source MAC address (614), and data block (630) designating the type of data payload, the implementations of which are apparent to one of ordinary skill in the art. The protocol header (620) denotes information such as the version and type of protocol and a sequence number. The data packet (630) further comprises an authentication protocol header (632) and a first authentication data packet (634). The authentication protocol header (632) conveys information (700) such as the version and type of authentication protocol and a sequence number. Such fields are common in network protocols and are not the subject of this disclosure.

Figure 7:
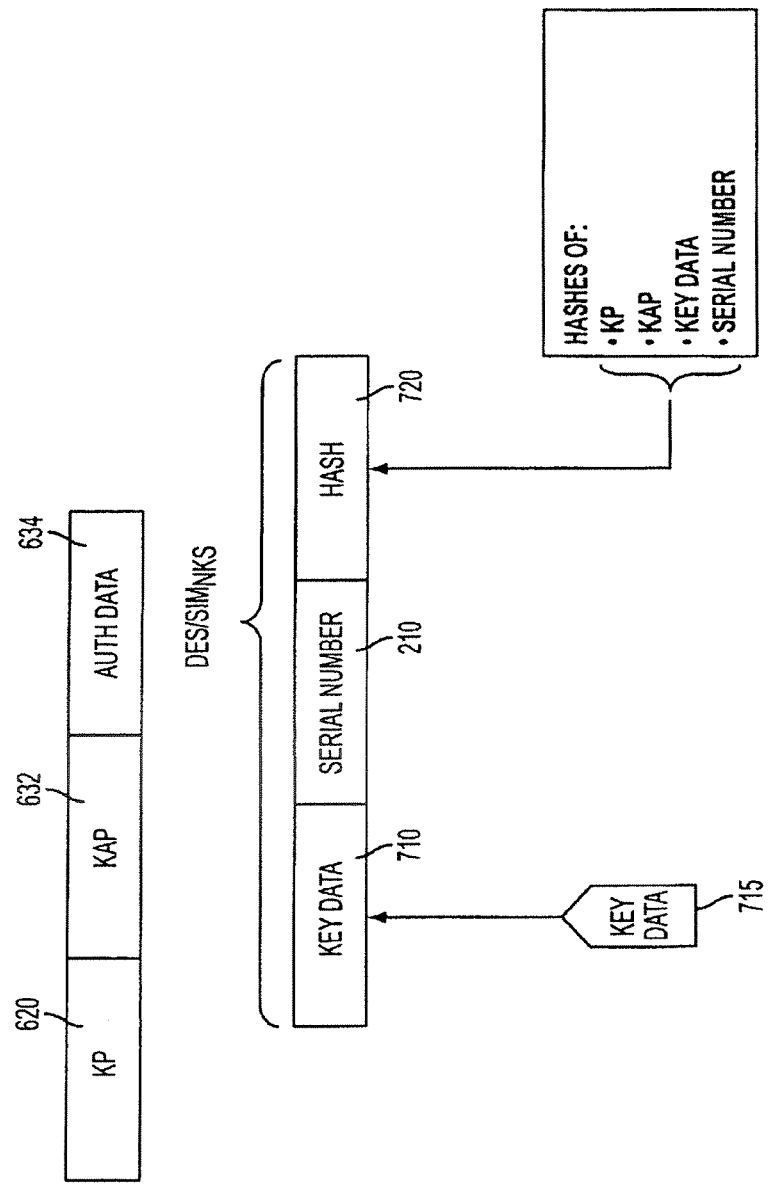
FIG. 7 illustrates a data transmission protocol format of the first authentication data packet of FIG. 6 according to an embodiment of the invention.

FIG. 7 illustrates a data transmission protocol format of the first authentication data packet (634) according to an embodiment of the invention. The protocol header (620) identifies the structure of the packet (634) and further indicates to the edge device (140) that a first authentication packet (634) is being transmitted. The first authentication data packet (634) comprises a Key Data field (710) followed by the serial number (210), corresponding to the subscriber token (125) of the transmitting computing device (120), and an optional hash field (720). The hash field (720) comprises a hash of the protocol header (620), authentication protocol header (632), Key Data field (710), and the serial number (210) that serves as an integrity check to ensure that the data once received has not been altered. The Key Data field (710) comprises Key Data (715), which is authentication information uniquely formed by the subscriber token (125) as described below. Once received, the edge device (140) processes the Key Data (715) and determines based on such, whether the subscriber's computing device (120) may access the wired network (190).

In at least one of the secure communications and authentication techniques described in commonly owned U.S. patent application Ser. Nos. 10/679,268, 10/679,371, and/or 10/679,472, a first random number ($R_1$) is generated and encrypted using the Subscriber Secret Key (240) for inclusion in the Key Data (715). This invention, however, recognizes that more than one user may in fact have the same Subscriber Secret Key (240) as noted above, which can be potentially associated with the same network edge device (140) at the same time. The following describes a technique to circumvent this problem.

Figure 8:
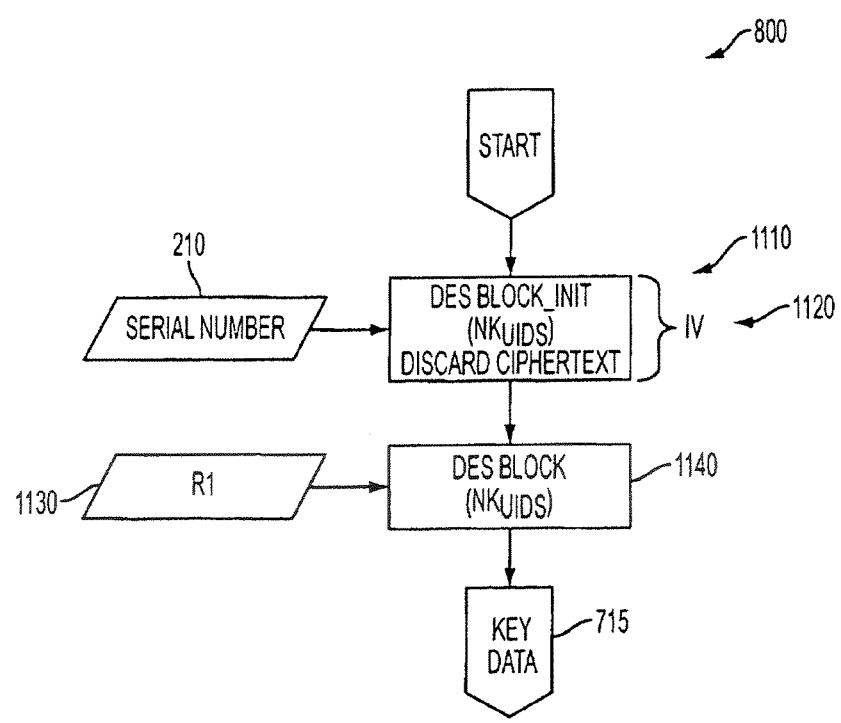
FIG. 8 illustrates a technique for computing the Key Data of FIG. 7 according to an embodiment of the invention.

FIG. 8 illustrates a technique (800) for computing the Key Data (715) according to an embodiment of the invention. As the serial number (210) is unique to each subscriber and cannot be duplicated or cloned, this unique value can be encrypted by the subscriber's smart card (128) using the Subscriber Secret Key (240). In a preferred embodiment of the invention, a Triple Data Encryption Standard (3DES) algorithm is employed within smart card (128) to perform cryptographic operations, the implementation of which is apparent to one of ordinary skill in the art. Other conventional cryptographic algorithms can be implemented in alternative embodiments. The 3DES algorithm comprises a "DES BLOCK INIT" function (810) and a "DES BLOCK" function (840). An initialization vector (IV) of the 3DES algorithm is originally set to nulls by the smart card (128) when calling the DES BLOCK INIT function (810). The standard output of the DES BLOCK INIT function (810) is encrypted text, commonly known as "ciphertext," and an interim initialization vector (IV, 820). The ciphertext output from the DES BLOCK INIT function (810) is not used, but the IV (820) that results from the DES BLOCK NIT function (810) operating on the serial number (210) is utilized by DES BLOCK function (840). Since both sides of the communications link (i.e., the subscriber token (125) and the edge device (140)) know the serial number (210) of the subscriber token (125) once the first authentication data packet (634) is received by the edge device (140), both sides can "throw away" the ciphertext output from the DES BLOCK NIT function (810), thereby leaving the resulting IV (820) from this function in memory. The resulting or intermediate IV (820), which is derived from the serial number (210), is used to encrypt a random number (830, $R_1$) generated by the smart card (128) using the DES BLOCK function (840) (not the DES BLOCK NIT function (810)) with the Subscriber Secret Key (240). Because the intermediate IV (820) was present, the ciphertext resulting from encrypting the random number (830) with the Subscriber Secret Key (240) has a different ciphertext output than it would have been using the normal DES BLOCK NIT function (810). The DES BLOCK NIT function (810) initializes the IV to null values prior to encryption, but the DES BLOCK function (840) uses whatever IV value happens to be in the register when it is called.

The DES BLOCK function (840) has as its output two products: a new IV and ciphertext. The IV stays in memory, but the ciphertext output, "Key Data," (715) is implemented in the further processing of the first authentication data packet (634). The important step here is that since the ciphertext output from operation of the DES BLOCK NIT function (810) is discarded, the receiving side of the authentication (i.e., the edge device (140)) would be unable to successfully decrypt the random number (830) using the same 3DES algorithm without first pre-setting its own IV. The receiving side has to first perform a DES BLOCK NIT function on the Subscriber Serial Number (210) and discard the ciphertext before trying to decrypt the Key Data (715).

The result of the two encryption steps, i.e., DES BLOCK NIT function (810) and DES BLOCK function (840), is a Key Data (715) ciphertext of the random number (830) using an IV that was the result of an encryption process on the subscriber's serial number (210). This Key Data (715) ciphertext is the result of encrypting the two data elements, i.e., IV (820) and random number (830), with the Subscriber Secret Key (240). As the serial number (210) is unique, the resulting Key Data (715) could not come from any other source, but the corresponding subscriber token (125).

Figure 9:
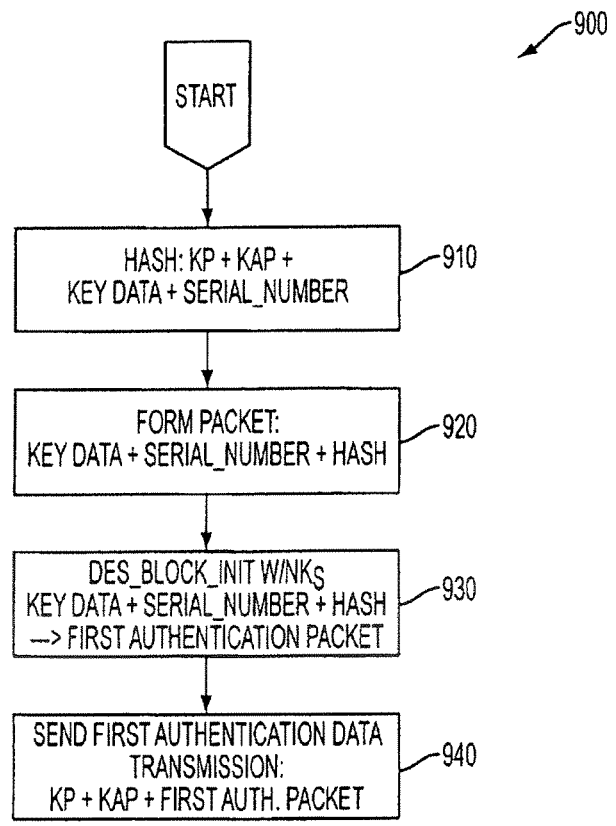
FIG. 9 illustrates a process for forming and transmitting the first authentication data transmission of FIG. 6 according to an embodiment of the invention.

FIG. 9 illustrates a process (900) for forming and transmitting the first authentication data transmission (600) according to an embodiment of the invention. Specifically, the protocol header (620), the authentication protocol header (632), the Key Data (715), and serial number (210) are hashed (step 910) to form an integrity signature of these data fields. The Key Data (715), the serial number (210), and the integrity signature are then combined (step 920) and then encrypted (step 930) with the Network Send Key (220) to form the first authentication data packet (634). The first authentication data transmission (600) comprising the protocol header (620), the authentication protocol header (632), and the first authentication data packet (634) are transmitted (step 940) to the network edge device (140).

Figure 10:
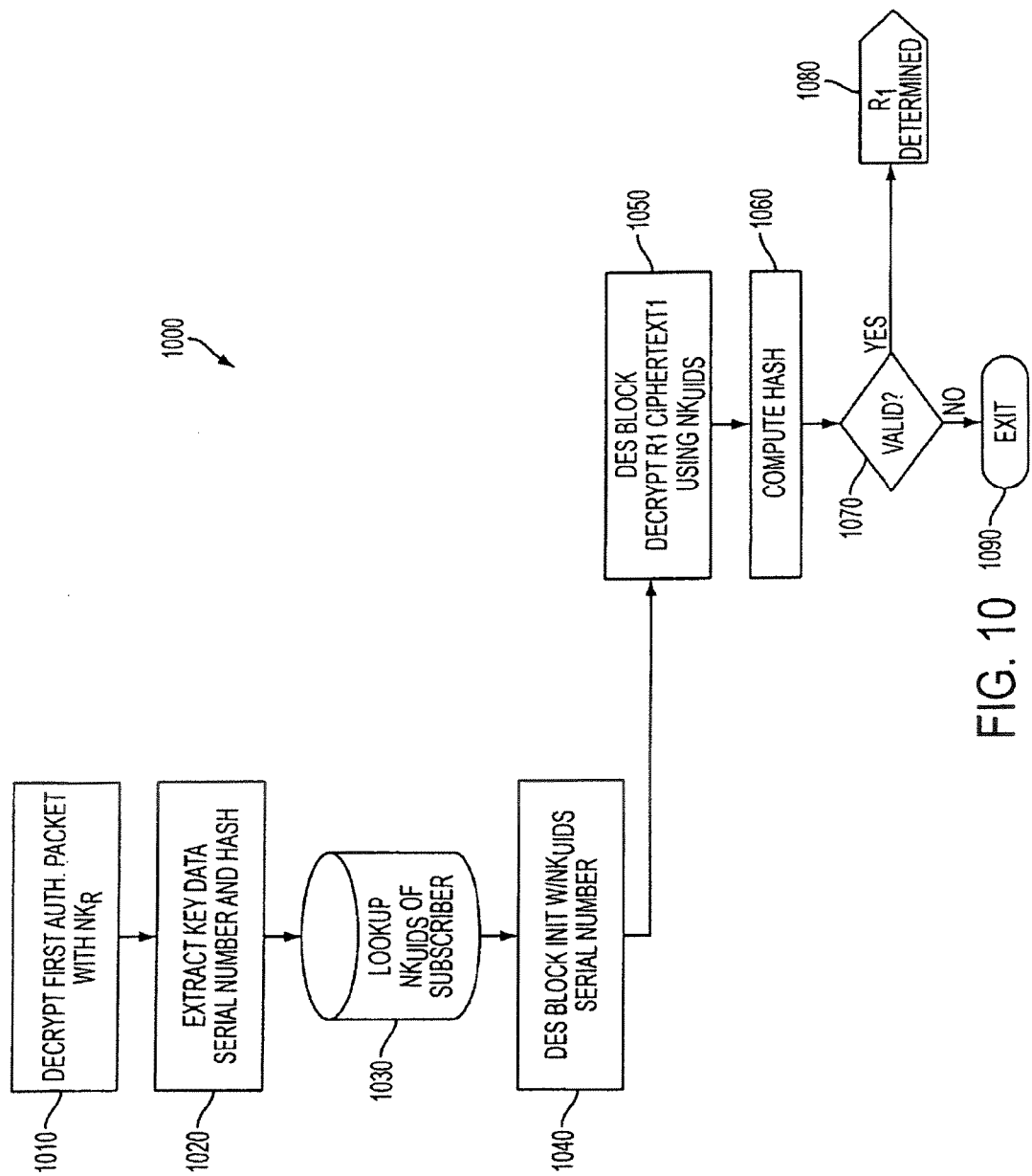
FIG. 10 illustrates an authentication request processing method according to an embodiment of the invention.

FIG. 10 illustrates an authentication request processing method (1000) performed by the edge device (140) according to an embodiment of the invention. Particularly, on receipt and determination that the received transmission comprises a first authentication data packet (634) (by examining both the protocol header (620) and authentication header (632)) the first authentication data packet (634) is decrypted (step 1010)

with the network receive key (NK$_R$) at the edge device (140). The resulting plain text allows the Key Data (715), the serial number (210), and the integrity hash (720) to be extracted (step 1020). The serial number (210) is then used to look up (step 1030) the Subscriber Secret Key (240) of the subscriber from the key table (310) stored in the network edge device (140) using the preferred modulus operation noted above. A DES BLOCK INIT function is performed (step 1040) using the Subscriber Secret Key (240) with the resulting ciphertext concatenated to the received Key Data (715) extracted. A DES BLOCK decrypt function is next performed (step 1050) on the concatenated ciphertext using the Subscriber Secret Key (240). A hash is then computed (step 1060) on the same fields as computed on the subscriber side. If the computed and received hashes match (step 1070), the data is assumed to be valid and the first random number (R$_1$) is determined (step 1080) from the result of step 1050. The subscriber is thus considered authenticated. If the hash is not valid, the program exits (step 1090) with no further action.

Figure 11:
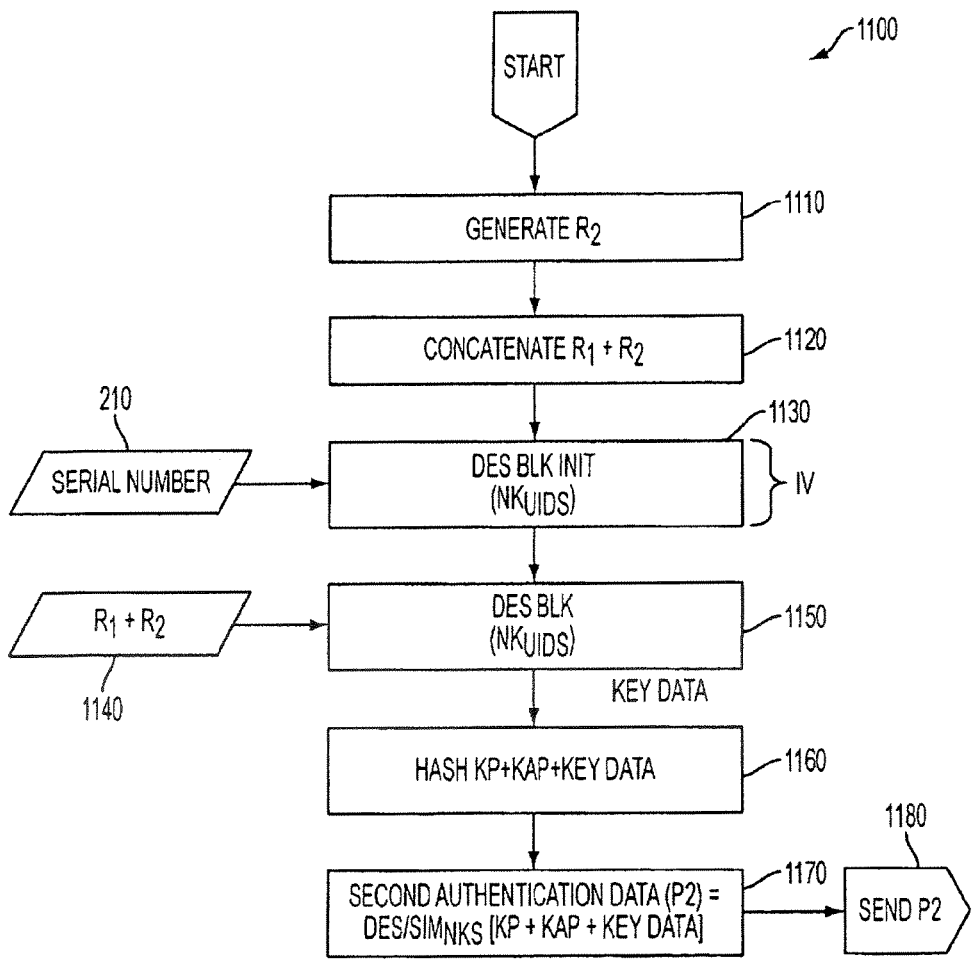
FIG. 11 illustrates an authentication response method performed by an edge device according to an embodiment of the invention.

FIG. 11 illustrates an authentication response method (1100) performed by the edge device (140) according to an embodiment of the invention. This method (1100) is implemented to generate and return a second authentication data transmission (identical in data format to the first authentication data transmission (600)) to the subscriber's computing device 120. Particularly, a second random number (R2) is generated (step 1110). The received first random number (R$_1$) is concatenated (step 1120) with this second random number to produce a concatenated random number result (1140). The serial number (210) received via the first authentication packet transmission (600) is then encrypted (step 1130) with the Subscriber Secret Key (240) located via key table 310 as noted above, using a DES BLOCK INIT function. The ciphertext output is discarded, but the IV result is retained. The concatenated random number result (1140) is then DES BLOCK encrypted (step 1150) with the Subscriber Secret Key (240) gaining the benefit of the IV retained in memory. A hash is then computed (step 1160) on the protocol header (620), the authentication header (632), the Key Data (715), and the serial number (230). A second authentication data transmission is then formed (step 1170) comprising an encryption of the Key Data (715), the serial number (210), and the hash (720) with the Network Send Key (220). The second authentication data transmission is further transmitted (step 1180) to the subscriber's computing device (120). In a preferred embodiment of the invention, the above processing in methods (1000) and (1100) is implemented by an edge device token (not shown), which is coupled to the edge device (140) and similar to the subscriber token (125).

Figure 12:
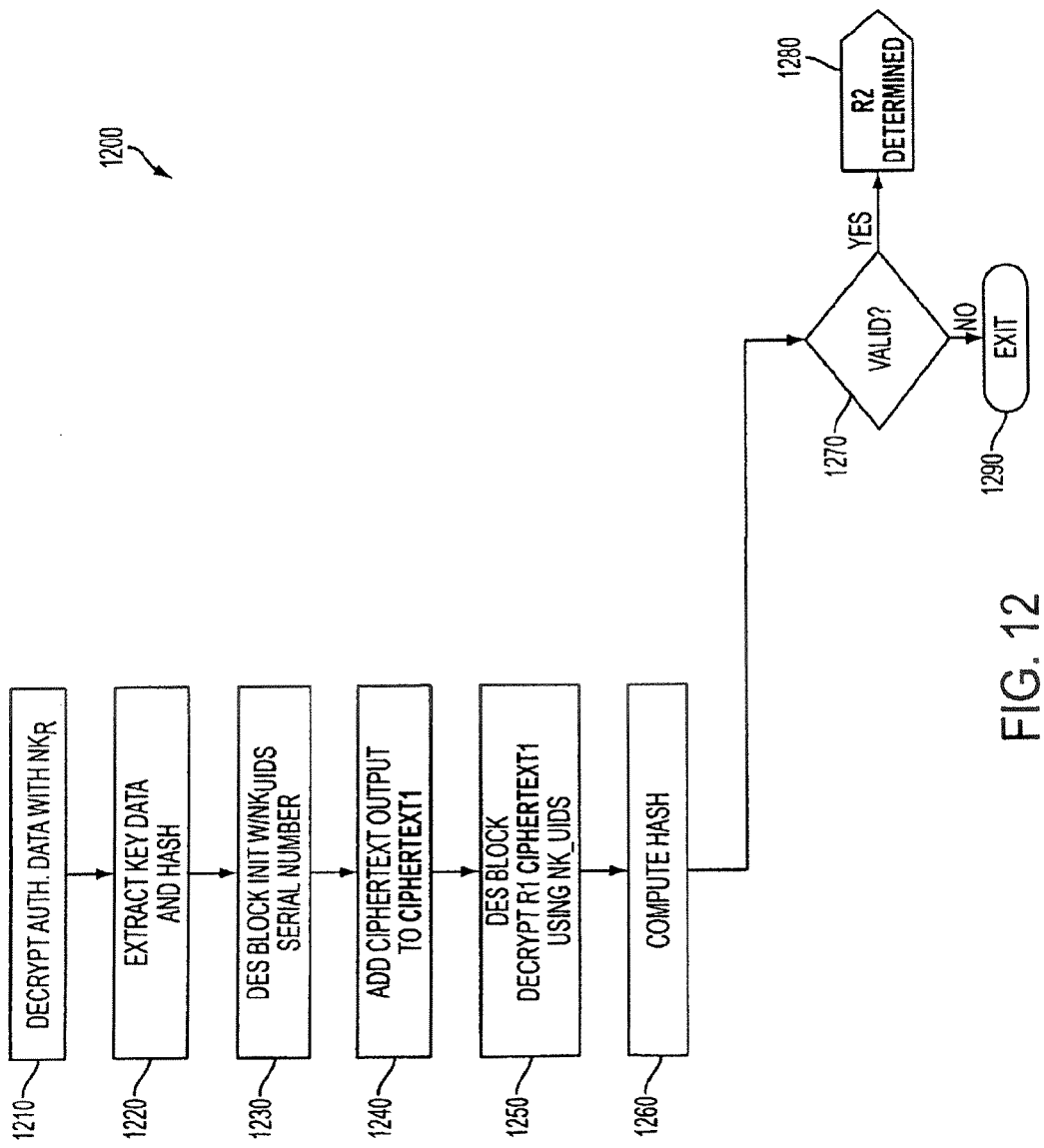
FIG. 12 illustrates an authentication response method performed by a subscriber's token according to an embodiment of the invention.

FIG. 12 illustrates an authentication response method (1200) performed by the subscriber token (125) according to an embodiment of the invention. On receipt of the second authentication data transmission from the edge device (140), the authentication data packet field (634) of this transmission is decrypted (step 1210) with the Network Receive Key. The resulting plain text enables the Key Data field (715) and hash (720) to be extracted (step 1220). The Key Data (715) this time comprises the encrypted values of the first random number generated by the subscriber, and the second random number generated by the network edge device (140). A optional comparison of the generated, original first random number and the received, processed first random number can be made as a further verification step (not shown). The subscriber's serial number (210) is then processed (step 1230) in a DES BLOCK INIT function. The ciphertext output is then prepended (step 1240) to the received Key Data field (715). This concatenated ciphertext is then decrypted (step 1250) using the Subscriber's Secret Key (240). A hash is then computed (step 1260) on the protocol header (620), the authentication protocol header (632), the Key Data (715), and the serial number (210) and compared (step 1570) against the received hash extracted in step 1220. If the received and computed hash figures match, the second random number (R$_2$) has been determined to be valid (step 1280). If the hashes do not match, further processing is suspended (step 1290).

In alternative embodiments of the invention, the Network Send Key (920) and the Network Receive Key (930) can be omitted, based upon on a symmetric encryption algorithm, or a public-key encryption algorithm.

This preferred embodiments described herein result in the generation of a unique encryption key based on an algorithm wherein the key is derived from a table-lookup using the last several digits of the Smart Card serial number as an index into the table of stored secret keys. Another use of the improvements described herein is to enable peer-to-peer encryption between two unrelated parties, i.e., two parties who have no particular knowledge of each other's key. For example, the present invention is application to Voice over Internet Protocol (VoIP), a protocol that enables people to use the Internet as the transmission medium for telephone calls by sending voice data in packets using Internet Protocol (IP) rather than by traditional circuit transmissions of the Public Switched Telephone Network (PSTN).

Figure 13:
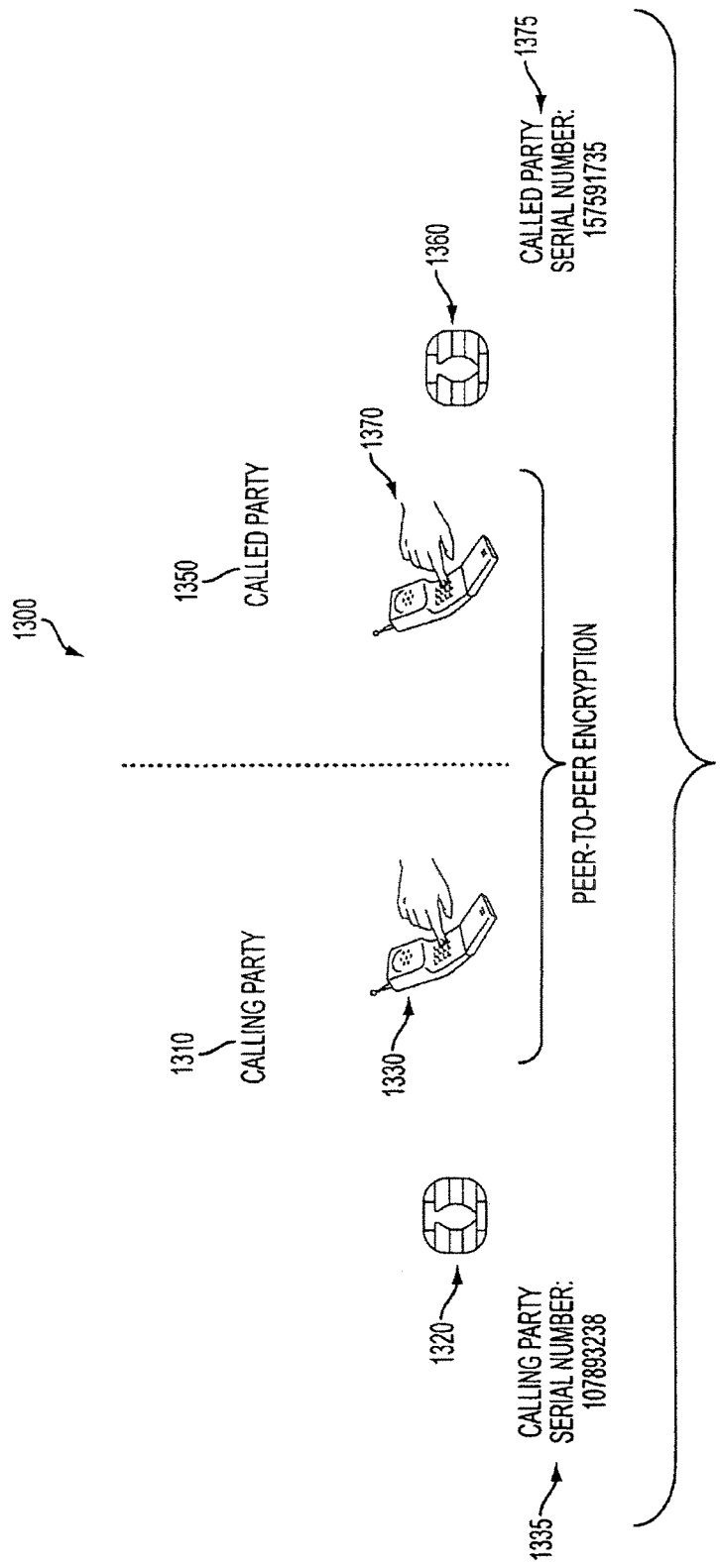
FIG. 13 illustrates a VoIP peer-to-peer encryption system according to an embodiment of the invention.

FIG. 13 illustrates a VoIP peer-to-peer encryption system (1300) according to an embodiment of the invention. In this embodiment (1300), two parties (1310 and 1350) wish to generate a unique session encryption key that is private to their particular connection. Each party implements a smart card (1320 and 1360), which functions similarly to the smart card (128) noted with respect to Wi-Fi. The smart cards (1310 and 1360) are coupled to respective VOID phones (1330 and 1370) or similar functioning hardware, software, or a combination thereof. Currently, VoIP phones do not establish security and thus the conversation between the parties over a public network (the Internet) is not protected. Conventional methods of establishing a secure communications session involve a transfer of one or more cryptographic keys between the two parties or between each of the parties and an external third party (server). The transfer of the cryptographic key is problematic to the overall security. However, the present invention provides a technique to generate a security key between two parties that cannot be known by any other party and does not require any server or third party support. For example, VoIP phones establish a peer-to-peer connection once the call is setup. The protocol for VOID technology is commonly known as H.323 and delineated in an Internet Engineering Task Force (IETF) specification RFC3261, the implementation of which is apparent to one of ordinary skill in the art. In an embodiment of the invention, the VOID phones (1330 and 1370) are associated with a unique electronic serial number (1335 or 1375), in this case, inside the smart cards (1320 and 1360).

Figure 14:
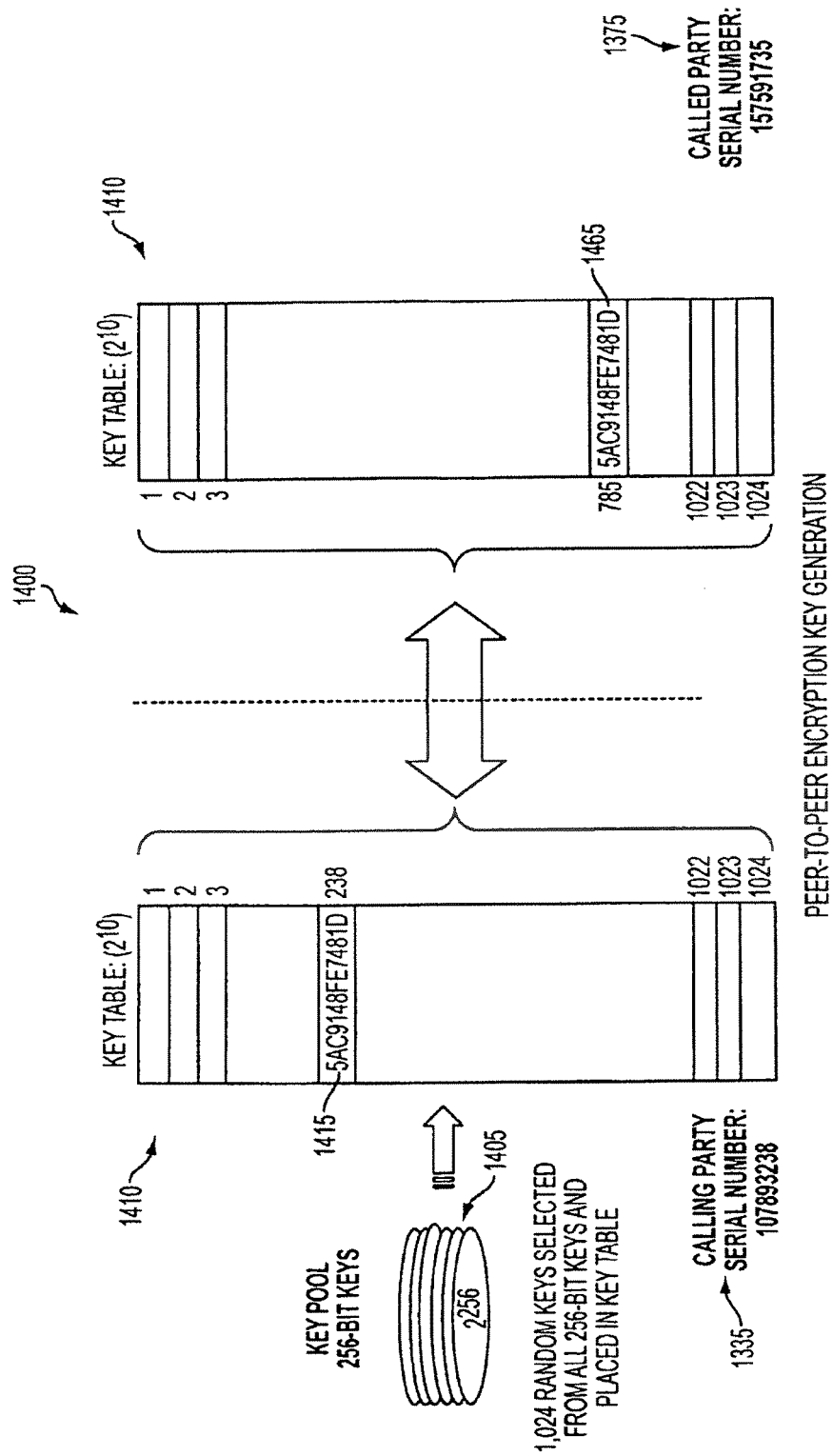
FIG. 14 illustrates a key table system in the Voice over IP (VoIP) peer-to-peer encryption system of FIG. 13 according to an embodiment of the invention.

The unique electronic serial number associated with each party is used as previously discussed to effect a "pointer" into a table of randomly chosen Session Keys. For example, FIG. 14 illustrates a key table system (1400) in a VoIP peer-to-peer encryption system according to an embodiment of the invention. Each VoIP phone (1330 and 1370) stores or has access to a key table (1410) derived from a larger key pool (1405) like the derivation noted with respect to the key table system (300). In a system with more than two VoIP phones/devices, all the phones (devices) have the same key table (1410) extracted from the same key pool. Each phone has the table installed in it identical to all other phones. In a preferred embodiment, the key table (1410) is downloaded to the VoIP phones (1330 and 1370) prior to the communications session between the parties. The smart card serial number (1335) of the calling party (1310) is used to select the proper key (1415) from the key table (1410) based on a mathematical operation, e.g., modulus operation as noted earlier. In a similar operation, the called party (1350) likewise uses the serial number (1375) of its smart card to select the proper key (1465) from its key table (1410).

Figure 15:
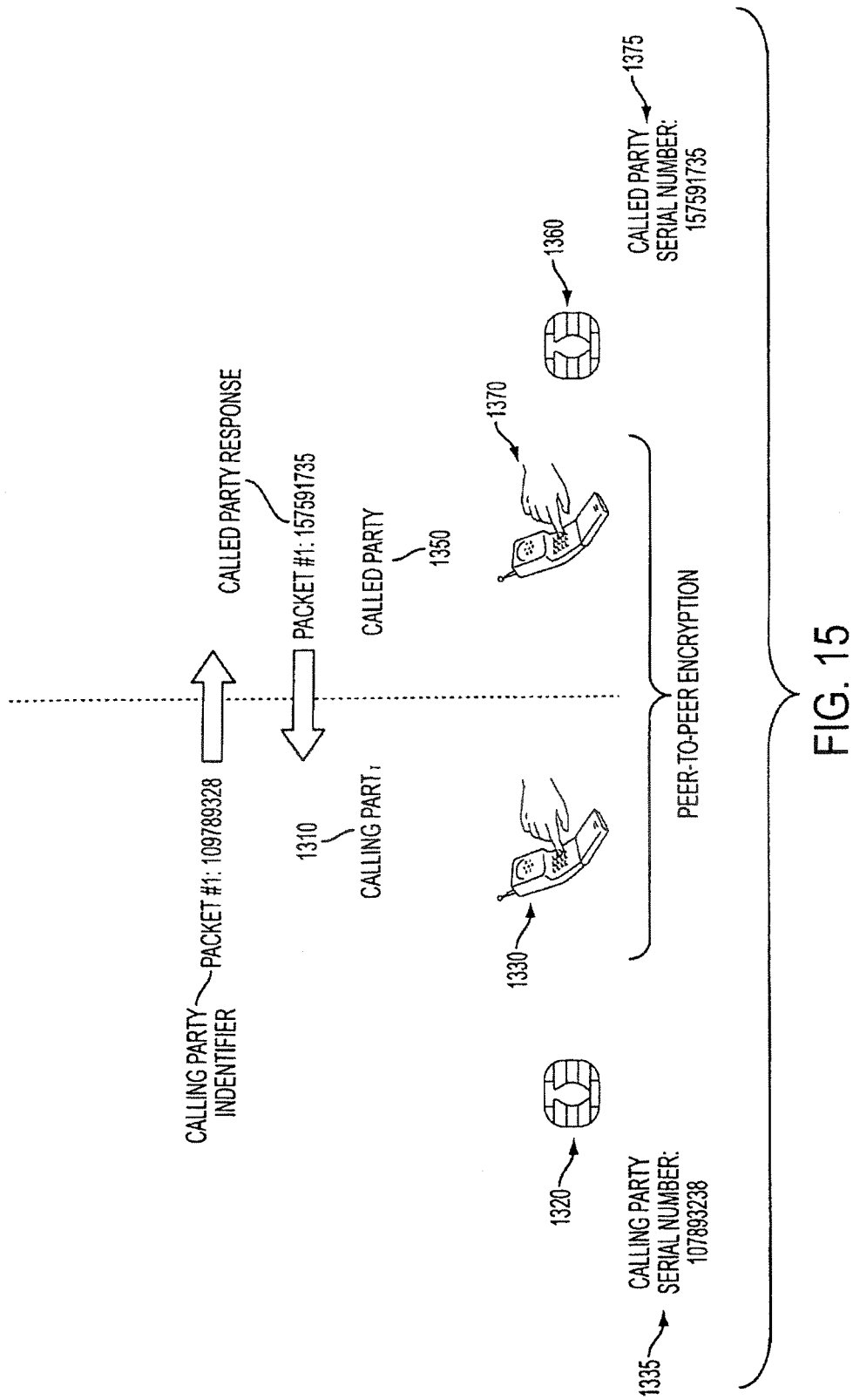
FIG. 15 illustrates a serial number exchange in the VoIP peer-to-peer encryption system of FIG. 13 according to an embodiment of the invention.

FIG. 15 illustrates a serial number exchange in the VoIP peer-to-peer encryption system (1300) according to an embodiment of the invention. As shown in this figure, the calling party (1310) sends a packet to the called party (1350) identifying itself by the serial number (1335) of its smart card (1320). The called party (1350) responds by sending a packet to the calling party (1300) with its own smart card serial number (1375).

FIG. 16 illustrates a technique (1600) for deriving a shared session key according to an embodiment of the invention. Particularly, both VOID phones (1330 and 1370) are able to retrieve the two keys (1415 and 1465) from the key table (1410) using the smart card serial numbers (1335 and 1375) communicated initially between the two parties (1310 and 1350). These two cryptographic keys (1415 and 1465), e.g., 256-bit Advanced Encryption Standard (AES) cryptographic keys, the implementation of which is apparent to one of ordinary skill in the art, are used to derive a shared session key (1610). In a preferred embodiment of the invention, the shared session key (1610) is described by implementing an "exclusive OR" operation (1605) on the two cryptographically keys (1415 and 1465). This results in a unique shared session key (1610) between the two parties. It is important to note that in no case were either key (1415 or 1465) exchanged between the two parties, i.e., both parties (1310 and 1350) independently computed the same shared session key (1610) based on the smart card serial numbers (1335 and 1375) of their smart cards (1320 and 1360). It is apparent to one of ordinary skill in the art that any mathematical operation can be used to compute the shared session key (1610) as long as it is known by both parties (1310 and 1350).

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

The invention claimed is:

1. A method of provisioning a key table for a network device, the method comprising:
generating a pool of cryptographic keys;
selecting a subset of the cryptographic keys from the pool of cryptographic keys for use in a network based on a processing capability of the device in the network;
generating a key table comprising the selected subset of the cryptographic keys;
encrypting the key table; and
transmitting the encrypted key table to the device, wherein at least one key in the key table is associated with a subscriber device based at least in part on a serial number associated with the subscriber device.

2. The method of claim 1, wherein the device is a network edge device.

3. A physical token for use with a communications device of a subscriber in a network having one or more network administrators, the physical token comprising:
a connector that communicates with a communications device;
a tamper-resistant serial number;
a memory having a set of cryptographic keys stored thereon, wherein at one of the cryptographic keys is retrieved based on a mathematical operation performed on the tamper-resistant serial number; and
a processor being configured to encrypt information using the set of cryptographic keys stored on the memory, wherein the set of cryptographic keys is never exposed outside the physical token in unencrypted form to any entity.

4. The physical token of claim 3, wherein the physical token is an active memory card.

5. The physical token of claim 3, wherein encrypting information is performed using the Advanced Encryption Standard algorithm.

* * * * *